United States Patent
Shinohara

(10) Patent No.: US 11,994,820 B2
(45) Date of Patent: May 28, 2024

(54) IMAGE FORMING APPARATUS AND METHOD

(71) Applicant: TOSHIBA TEC KABUSHIKI KAISHA, Tokyo (JP)

(72) Inventor: Eiji Shinohara, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/938,974

(22) Filed: Sep. 7, 2022

(65) Prior Publication Data

US 2023/0152741 A1  May 18, 2023

(30) Foreign Application Priority Data

Nov. 15, 2021 (JP) .................. 2021-185865

(51) Int. Cl.
*G03G 15/00* (2006.01)
*G06K 15/00* (2006.01)

(52) U.S. Cl.
CPC .......... *G03G 15/55* (2013.01); *G06K 15/408* (2013.01)

(58) Field of Classification Search
CPC .... G03G 15/5012; G03G 15/55; G03G 15/70; G06K 15/408
See application file for complete search history.

(56) References Cited

U.S. PATENT DOCUMENTS

| | | | | |
|---|---|---|---|---|
| 2005/0074253 A1* | 4/2005 | Cho | ..................... | G03G 15/205 399/70 |
| 2007/0045293 A1* | 3/2007 | Ishikawa | ............ | G03G 15/2039 219/619 |
| 2007/0252547 A1* | 11/2007 | Kifuku | .................... | H02P 23/06 318/432 |
| 2015/0145454 A1* | 5/2015 | Kameyama | ........ | G03G 15/5008 318/400.34 |
| 2016/0349679 A1* | 12/2016 | Masuda | ................. | G03G 15/80 |
| 2020/0145543 A1* | 5/2020 | Yoshimoto | ......... | H04N 1/00079 |
| 2020/0233356 A1* | 7/2020 | Seki | ........................ | G03G 15/55 |
| 2021/0006665 A1* | 1/2021 | Ito | ...................... | H04N 1/00899 |
| 2021/0127019 A1* | 4/2021 | Yoshimoto | ......... | H04N 1/00074 |

FOREIGN PATENT DOCUMENTS

JP    2008-158083    7/2008

* cited by examiner

*Primary Examiner* — Carla J Therrien

(74) *Attorney, Agent, or Firm* — Amin, Turocy & Watson, LLP

(57) ABSTRACT

According to one embodiment, an image forming apparatus includes a driving unit, a first determination unit, a second determination unit, and an output unit. The first determination unit is configured to determine whether or not a rotation abnormality relating to rotation of the driving unit occurs. The second determination unit is configured to determine whether or not a signal abnormality relating to a signal line of a current signal of the driving unit occurs based on a current value of the current signal after the first determination unit determines whether or not the rotation abnormality occurs. The output unit is configured to output a determination result of the second determination unit.

20 Claims, 6 Drawing Sheets

IMAGE FORMING APPARATUS AND METHOD

CROSS-REFERENCE TO RELATED APPLICATION

This application is based upon and claims the benefit of priority from Japanese Patent Application No. 2021-185865, filed on Nov. 15, 2021, the entire contents of which are incorporated herein by reference.

FIELD

Embodiments described herein relate generally to an image forming apparatus and a method.

BACKGROUND

In the related art, an image forming apparatus includes various motors (driving units), in which rollers that rotate with driving forces of the motors are disposed. For example, a fixing unit includes a heating roller in which a fixing heater is built, a pressurization roller that is pressed against the heating roller, and a fixing motor that rotates the heating roller and the pressurization roller. The fixing unit melts and fixes toner on a sheet to the sheet while the sheet is passing through a gap between the heating roller and the pressurization roller.

In addition, in the image forming apparatus, a technique of displaying an error or stopping the operation if an abnormality occurs in each of the rollers, the fixing motor, or the like is also known. In addition, an abnormality or a breakdown around various motors can be estimated by monitoring current values of current signals of the various motors.

However, in the related art, there may be a case where an abnormality relating to a signal line of a current signal of a driving unit cannot be easily determined such that an abnormality or a breakdown around a motor cannot be estimated.

DETAILED DESCRIPTION

Figure 1:
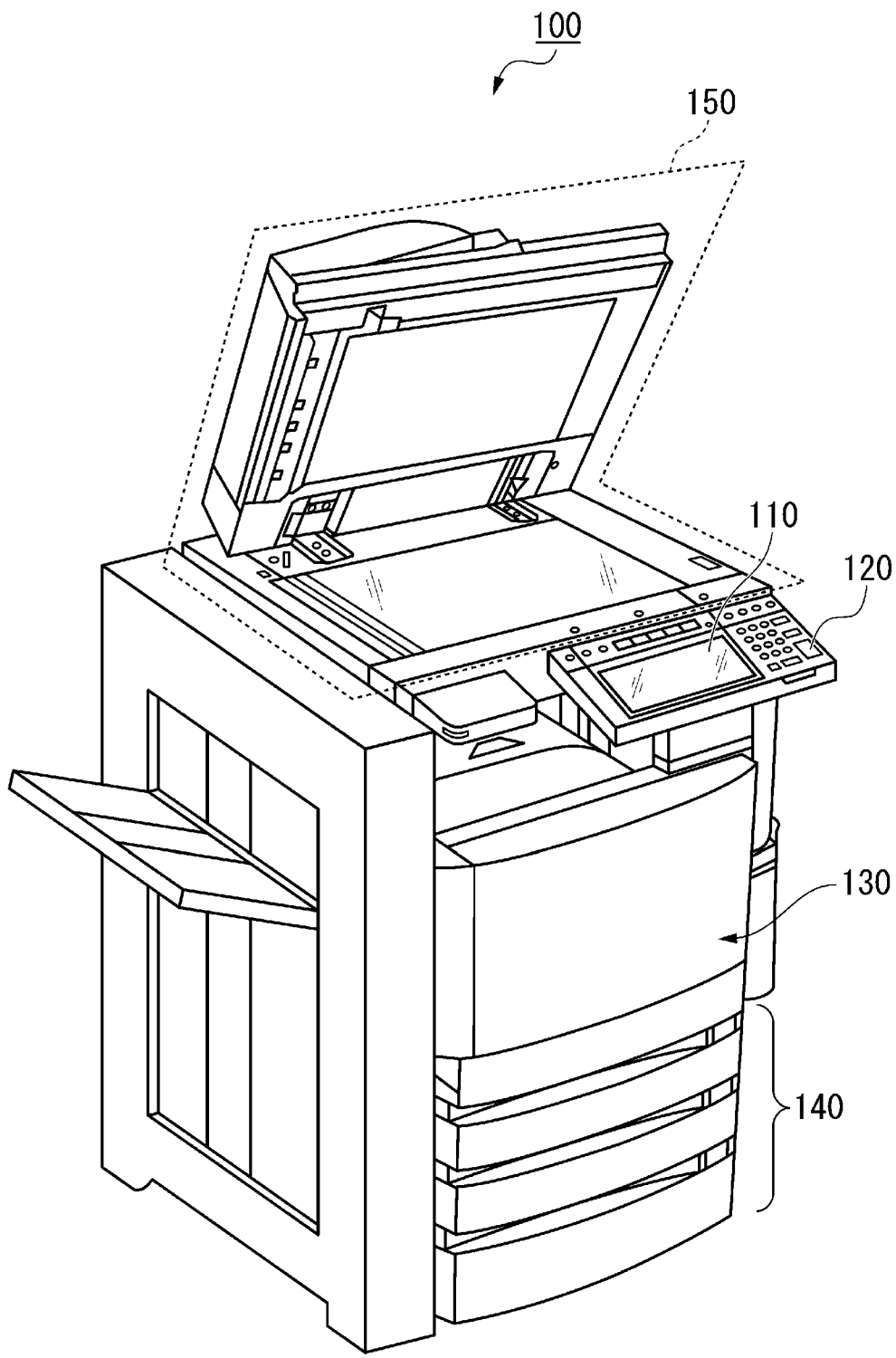
FIG. 1 is an appearance diagram illustrating an overall configuration example of an image forming apparatus 100 according to an embodiment.

Embodiments provide an image forming apparatus and a method in which estimation failure of an abnormality or a breakdown around a driving unit can be reduced.

In general, according to one embodiment, an image forming apparatus includes a driving unit, a first determination unit, a second determination unit, and an output unit. The first determination unit is configured to determine whether or not a rotation abnormality relating to rotation of the driving unit occurs. The second determination unit is configured to determine whether or not a signal abnormality relating to a signal line of a current signal of the driving unit occurs based on a current value of the current signal after the first determination unit determines whether or not the rotation abnormality occurs. The output unit is configured to output a determination result of the second determination unit.

Hereinafter, an image forming apparatus and a method according to an embodiment will be described with reference to the drawings. In the following description, components having the same or equivalent function are represented by the same reference numeral. In addition, repeated description of configurations will not be made in some cases.

First, an overall configuration of an image forming apparatus 100 will be described using FIG. 1.

FIG. 1 is an appearance diagram illustrating an overall configuration example of the image forming apparatus 100 according to the embodiment. The image forming apparatus 100 is, for example, a multi-function peripheral. The image forming apparatus 100 includes a display 110, a control panel 120, a printer 130, a sheet accommodation unit 140, and an image reading unit 150.

The display 110 is, for example, a touch panel type liquid crystal display. The display 110 displays various information. In addition, the display 110 receives the operation of a user.

The control panel 120 includes various operation keys such as numeric keypad or a start key. The control panel 120 receives various input operations from the user. In addition, the control panel 120 outputs operation signals corresponding to the various input operations received from the user to a control unit.

The printer 130 executes a series of printing operations using various information output from the display 110, the control panel 120, the image reading unit 150, and the like. The series of printing operations include an operation of inputting image information, an operation of forming an image, an operation of transferring the formed image to a sheet, and an operation of conveying the sheet.

The sheet accommodation unit 140 includes a plurality of sheet cassettes. Each of the sheet cassettes accommodates a sheet. The sheet is mainly typical copy paper but may also be, for example, a photographic sheet, a label sheet, or a polyester film sheet.

The image reading unit 150 includes an automatic document feeder device and a scanner device. The automatic document feeder device feeds a document placed on a document tray to the scanner device. The scanner device optically scans the document on the document glass tray and focuses reflected light from the document on a light receiving surface of a charge coupled device (CCD) sensor. As a result, the scanner device reads a document image on the document glass tray. The image reading unit 150 generates image information (image data) using the read result read by the scanner device.

Figure 2:
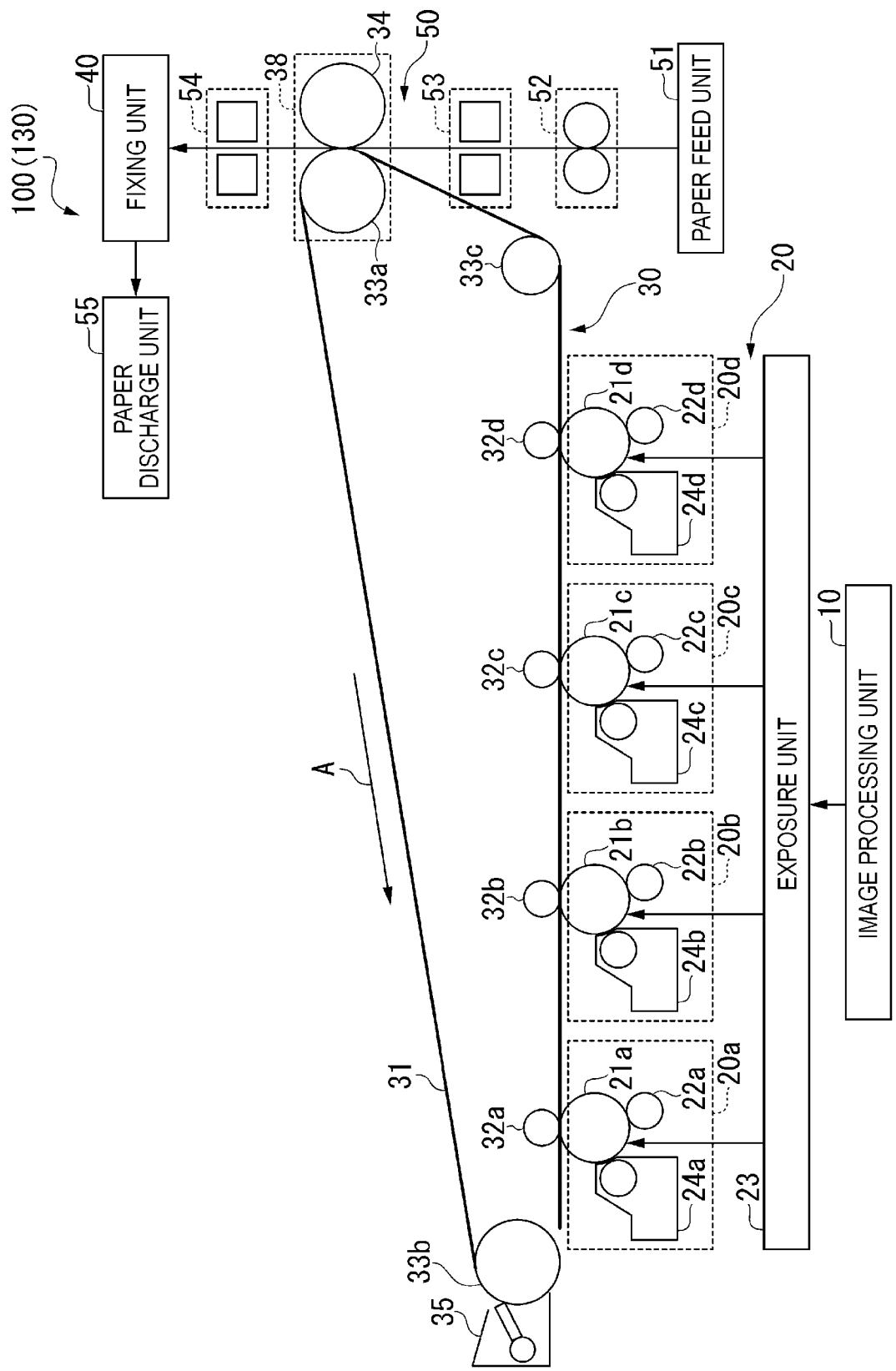
FIG. 2 is a diagram illustrating an example of an internal configuration of the image forming apparatus 100.

FIG. 2 is a diagram illustrating an example of an internal configuration of the image forming apparatus 100. As illustrated in FIG. 2, the image forming apparatus 100 (printer 130) includes four image forming units 20a to 20d in parallel. The image forming apparatus 100 is a quadruple-tandem type image forming apparatus. The image forming apparatus 100 includes an image processing unit 10, an image forming unit 20 (20a to 20d), an intermediate transfer unit 30, a fixing unit 40, and a sheet conveying unit 50.

The image processing unit 10 inputs image information. The input image information is image information generated by the image reading unit 150 or image information transmitted from another device. The image processing unit 10 executes digital image processing of processing the input image information in accordance with an initial setting or a user setting. For example, the digital image processing includes gradation correction based on gradation correction data. In addition, the digital image processing includes, in addition to the gradation correction, various correction processes such as color correction or shading correction and other processes such as compression on the image data.

Next, the image forming unit 20 (image forming units 20a to 20d) will be described. The image forming unit 20 includes the image forming unit 20a corresponding to yellow (Y), the image forming unit 20b corresponding to magenta (M), the image forming unit 20c corresponding to cyan (C), and the image forming unit 20d corresponding to black (K). The image forming units 20a to 20d include photoconductive drums 21a to 21d, charging units 22a to 22d, an exposure unit 23, developing units 24a to 24d, toner cartridges 25a to 25d, and a drum cleaning device (not illustrated). In the following description, a to d of the reference numerals are omitted.

The photoconductive drum 21 is, for example, a charged organic photoconductor (OPC) in which an undercoat layer, a charge generation layer, and a charge transport layer are sequentially stacked on a circumferential surface of an aluminum conductive cylindrical body. The photoconductive drum 21 is photoconductive.

The charging unit 22 causes corona discharge to occur. The charging unit 22 uniformly charges a surface of the photoconductive drum 21.

The exposure unit 23 is, for example, a semiconductor laser. The exposure unit 23 irradiates the photoconductive drum 21 with laser light corresponding to images of the color components. If the photoconductive drum 21 is irradiated with the laser light by the exposure unit 23, a potential of a region irradiated with the laser light in the region of the surface of the photoconductive drum 21 changes. Due to this change in potential (potential difference), an electrostatic latent image is formed on the surface of the photoconductive drum 21.

The developing unit 24 contains a developer. The developing unit 24 attaches toners of the color components to the surface of the photoconductive drum 21. As a result, a toner image is formed on the surface of the photoconductive drum 21. That is, the electrostatic latent image formed on the surface of the photoconductive drum 21 is visualized.

Here, the developer will be described. As the developer, for example, a two-component developer is used. The two-component developer contains non-magnetic toner and a carrier. As the carrier, for example, iron powder or polymer ferrite particles having a particle size of several tens of micrometers are used. The carrier is mixed with the toner in the developing unit 24 and is triboelectrically charged such that charge (for example, negative charge) is applied to the toner. In addition, the carrier conveys the toner to the electrostatic latent image using a magnetic force.

In addition, the drum cleaning device (not illustrated) includes a cleaning blade that comes into contact with the surface of the photoconductive drum 21. The cleaning blade removes residual toner remaining on the surface of the photoconductive drum 21 after the primary transfer. The removed residual toner is collected by an accommodation unit in the drum cleaning device.

Next, the intermediate transfer unit 30 will be described. The intermediate transfer unit 30 includes an intermediate transfer medium 31, a primary transfer roller 32, a plurality of support rollers 33, a secondary transfer roller 34, and a belt cleaning device 35.

The intermediate transfer medium 31 is, for example, an endless belt (transfer belt). The intermediate transfer medium 31 is a belt not having conductivity and elasticity. Specifically, the intermediate transfer medium 31 is, for example, a polyimide belt. The intermediate transfer medium 31 may have conductivity and elasticity.

The support rollers 33a to 33c support the intermediate transfer medium 31 such that a tensile force is applied to the intermediate transfer medium 31. As a result, the intermediate transfer medium 31 is formed in a loop shape. Among the plurality of support rollers 33a to 33c, one roller (for example, the support rollers 33a) is a driving roller. The rollers other than the driving roller are driven rollers. By driving and rotating the driving roller, the intermediate transfer medium 31 moves in an A direction of the drawing at a predetermined speed at a predetermined period.

Here, the direction in which the intermediate transfer medium 31 moves can be defined as an upstream direction and a downstream direction. Specifically, in the direction in which the intermediate transfer medium 31 moves, the image forming unit 20a can be defined as the most upstream side, and the belt cleaning device 35 can be defined as the most downstream side.

The primary transfer roller 32 is disposed to face the photoconductive drum 21 through the intermediate transfer medium 31. Specifically, the primary transfer roller 32 is disposed such that a pressure is applied to the photoconductive drum 21 in a state where the intermediate transfer medium 31 is interposed therebetween. As a result, the primary transfer roller 32 and the photoconductive drum 21 form a primary transfer unit that nips the intermediate transfer medium 31.

If the intermediate transfer medium 31 passes through the primary transfer unit, the toner image formed on the photoconductive drum 21 is transferred to the intermediate transfer medium 31. If the intermediate transfer medium 31 passes through the primary transfer unit, a primary transfer bias is applied to the primary transfer roller 32. Specifically, charge having a polarity (positive polarity) opposite to that of the toner is applied to the primary transfer roller 32. As a result, the toner image formed on the photoconductive drum 21 is electrostatically transferred to the intermediate transfer medium 31.

The secondary transfer roller 34 is disposed to face the support rollers 33a through the intermediate transfer medium 31. Specifically, the secondary transfer roller 34 is disposed such that a pressure is applied to the support rollers 33a in a state where the intermediate transfer medium 31 is interposed therebetween. As a result, the secondary transfer roller 34 and the support rollers 33a form a secondary transfer unit 38 that nips the intermediate transfer medium 31 and the sheet.

If the sheet passes through the secondary transfer unit 38, the toner image formed on the intermediate transfer medium 31 is transferred to the sheet. If the sheet passes through the secondary transfer unit 38, a secondary transfer bias is applied to the support rollers 33a. Specifically, charge having the same polarity (negative polarity) as that of the toner is applied to the support rollers 33a. As a result, the toner image on the intermediate transfer medium 31 is electrostatically transferred to the sheet.

The secondary transfer roller 34 and the support rollers 33a are configured to be separable from each other. As a result, if the sheet is clogged in the secondary transfer unit 38, the user can remove the sheet.

The belt cleaning device 35 includes a cleaning blade that comes into contact with the surface of the intermediate transfer medium 31. The cleaning blade removes residual toner remaining on the surface of the intermediate transfer medium 31 after the secondary transfer. The removed residual toner is collected by an accommodation unit in the belt cleaning device 35.

The fixing unit 40 heats and pressurizes the sheet to which the toner image is transferred. The fixing unit is, for example, a roller type including: a heating roller that heats the sheet; and a pressurization roller that is pressed against the heating roller. As a result, the fixing unit 40 fixes the toner image to the sheet. A method of heating the sheet through a film-shaped member to fix the toner image to the sheet is also applicable to the fixing unit 40.

Next, the sheet conveying unit 50 will be described. The sheet conveying unit 50 includes a paper feed unit 51, a registration unit 52, a first guide unit 53, a second guide unit 54, and a paper discharge unit 55.

The paper feed unit 51 conveys the sheets accommodated in the sheet accommodation unit 140 one by one to the registration unit 52. The registration unit 52 stops the sheet conveyed from the paper feed unit 51 and supplies the sheet to the secondary transfer unit 38 at a predetermined timing. The predetermined timing is a timing at which the toner image formed on the intermediate transfer medium 31 is secondarily transferred by the secondary transfer unit 38. The first guide unit 53 restricts a conveying direction of the sheet supplied from the registration unit 52 to the secondary transfer unit 38.

The secondary transfer unit 38 transfers the toner image to the sheet of which the conveying direction is restricted by the first guide unit 53. Further, the secondary transfer unit 38 supplies the sheet to which the toner image is transferred to the fixing unit 40.

The second guide unit 54 restricts the conveying direction of the sheet supplied from the secondary transfer unit 38 to the fixing unit 40. The fixing unit 40 heats and pressurizes the sheet of which the conveying direction is restricted by the second guide unit 54, and supplies the sheet to the paper discharge unit 55. The paper discharge unit 55 supplies the sheet to a discharge tray.

Next, a hardware configuration of the image forming apparatus 100 will be described using FIG. 3.

Figure 3:
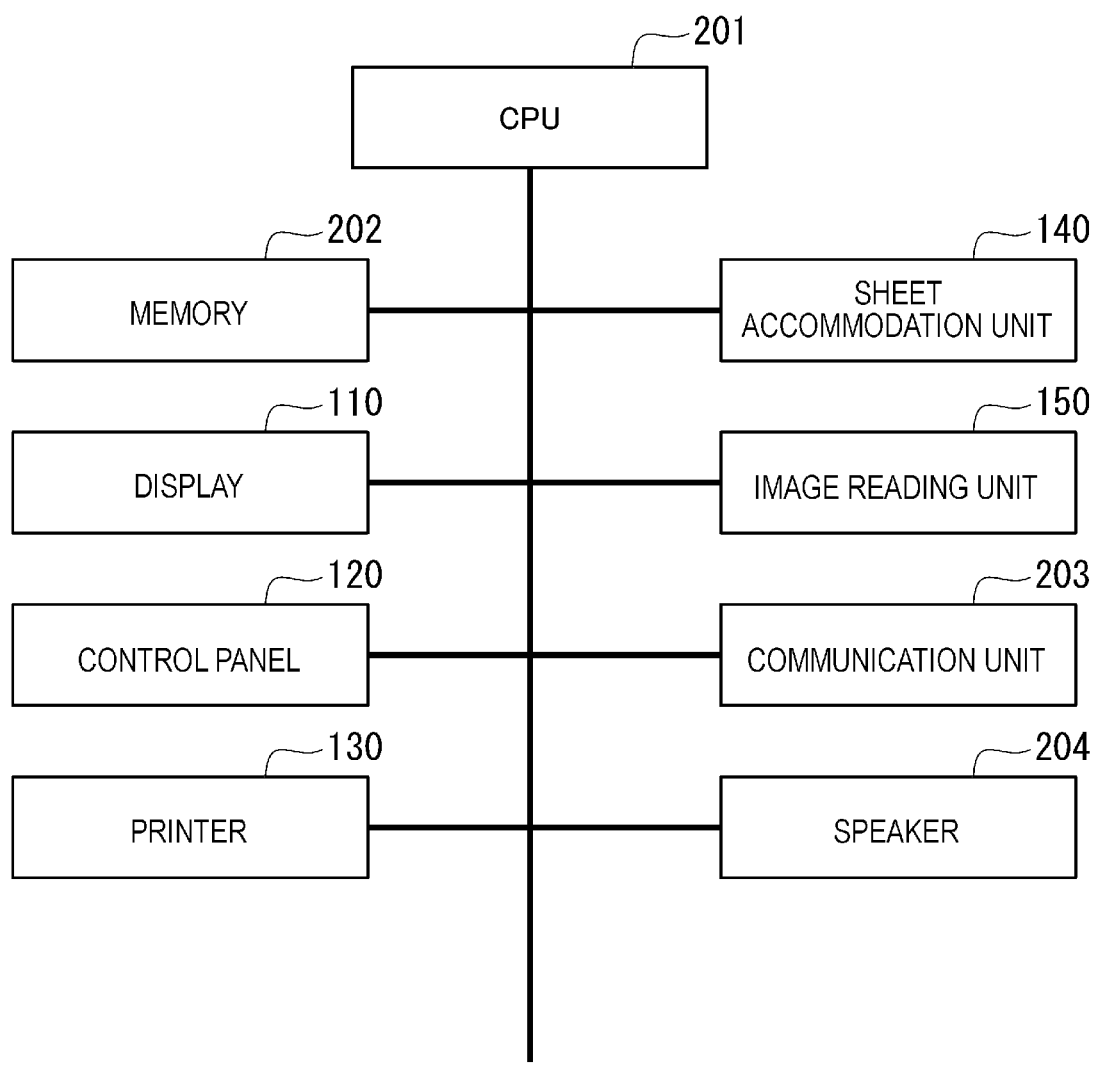
FIG. 3 is a diagram illustrating an example of a hardware configuration of the image forming apparatus 100.

FIG. 3 is a diagram illustrating an example of the hardware configuration of the image forming apparatus 100. As illustrated in FIG. 3, in addition to the above-described configurations, the image forming apparatus 100 includes a central processing unit (CPU) 201, a memory 202, a communication unit 203, and a speaker 204. The components can communicate with each other via a bus.

The CPU 201 is a central processing unit and controls the operation of the image forming apparatus 100 by loading and executing various programs stored in the memory 202. The various programs include an abnormality determination program according to the embodiment.

The memory is a ROM, a RAM, a hard disk, or the like. The ROM is a read only memory, and stores not only programs but also various information used by the CPU. The RAM is a readable or writable memory, and stores various information. For example, the RAM stores information acquired from an external apparatus or information generated in various processes. The hard disk stores various information.

The communication unit 203 is an interface that transmits and receives information to and from another apparatus.

The speaker 204 outputs a voice.

Next, a functional configuration of the control unit 300 will be described using FIG. 4.

Figure 4:
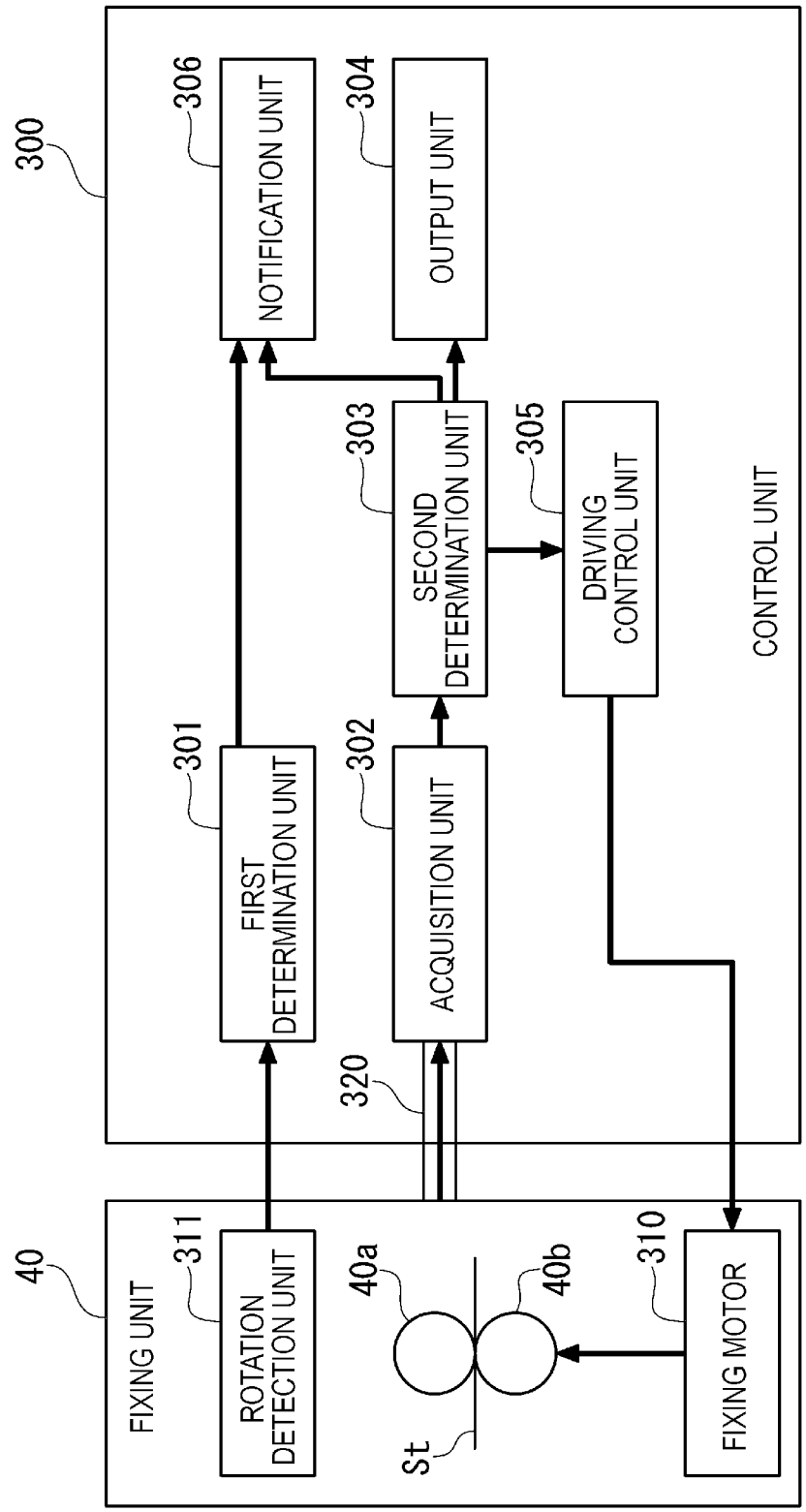
FIG. 4 is a diagram illustrating an example of a functional configuration of a control unit 300.

FIG. 4 is a diagram illustrating an example of the functional configuration of the control unit 300. The control unit 300 includes a first determination unit 301, an acquisition unit 302, a second determination unit 303, an output unit 304, a driving control unit 305, and a notification unit 306. The units are implemented by the CPU 201. That is, the function of each of the units is implemented by the CPU 201 executing a predetermined program stored in the memory. The process according to the embodiment is not necessarily executed by the CPU 201 executing the program. For example, the process according to the embodiment can also be executed using hardware (circuit unit; including circuitry) such as an LSI (large scale integration), an ASIC (application specific integrated circuit), a FPGA (field-programmable gate array), or a GPU (graphics processing unit), or can also be executed using software and hardware in combination.

Hereinafter, the fixing unit 40 as a target to be controlled by the control unit 300 will be described as an example. In FIG. 4, the fixing unit 40 includes a heating roller 40a and a pressurization roller 40b. A nip region is formed between the heating roller 40a and the pressurization roller 40b. While the sheet St is passing through the nip region, the toner on the sheet St melts and is fixed to the sheet. The heating roller 40a and the pressurization roller 40b rotate with a driving force of a fixing motor 310. The fixing motor 310 is an example of the driving unit.

The fixing motor 310 only needs to drive one of the heating roller 40a or the pressurization roller 40b. The other (non-driven) one of the heating roller 40a or the pressurization roller 40b is driven to rotate by the rotation of the one of the heating roller 40a or the pressurization roller 40b. During printing, the heating roller 40a and the pressurization roller 40b rotate with the driving force of the fixing motor 310. Therefore, a load on the fixing motor 310 increases.

The first determination unit 301 determines whether or not a rotation abnormality relating to the rotation of the fixing motor 310 occurs. Specifically, the first determination unit 301 acquires a signal representing the rotation value of the fixing motor 310 from a rotation detection unit 311. The rotation detection unit 311 is, for example, a sensor that detects an operation of an actuator that rotates together with the rotation of the heating roller 40a and the pressurization roller 40b. If the heating roller 40a and the pressurization roller 40b are rotated, the first determination unit 301 determines that the fixing motor 310 is normal based on the signal. If the heating roller 40a and the pressurization roller 40b are not rotated, the first determination unit 301 determines that the fixing motor 310 is abnormal (rotation abnormality) based on the signal.

The acquisition unit 302 acquires a current value of a current signal of the fixing motor 310 after the first determination unit 301 determines whether or not the rotation abnormality occurs. The acquisition unit 302 acquires the current value through a signal line 320. The current signal is, for example, an analog signal. The current value is, for example, a current value acquired if the first determination unit 301 determines whether or not the rotation abnormality occurs. The current value represents a load on the fixing motor 310 and is used for monitoring to estimate a breakdown. For example, if a sheet conveyance belt deteriorates such that the load increases or if the belt is cut such that the load decreases, the current value varies depending on the change in load. A breakdown is estimated based on the determination using not only the current value of the fixing motor 310 but also various information such as a PM counter (for example, a driving time of a roller or the number of sheets printed) or a jam (clogging) occurrence state.

The second determination unit 303 determines whether or not a signal abnormality relating to the signal line 320 of the current signal occurs based on the current value acquired by the acquisition unit 302. Specifically, the signal abnormality is disconnection of the signal line 320 of a harness or disconnection or short-circuit of the signal line 320 on a substrate. If the current value is appropriate (in a first predetermined range), the second determination unit 303 determines that the signal abnormality does not occur. On the other hand, if the current value is not appropriate, the second determination unit 303 determines that the signal abnormality occurs.

Whether the signal abnormality is short-circuit or disconnection can be determined depending on whether the signal abnormality is an abnormality where the current value exceeds an upper limit value or an abnormality where the current value falls below a lower limit value. For example, if the current value exceeds the upper limit value, the second determination unit 303 determines that the signal abnormality is short-circuit, and if the current value falls below the lower limit value, the second determination unit 303 determines that the signal abnormality is disconnection.

The output unit 304 outputs the determination result of the second determination unit 303. The output unit 304 causes the display 110 to display the determination result of the second determination unit 303 in accordance with the determination result of the second determination unit 303. For example, if the second determination unit 303 determines that the signal abnormality does not occur, the output unit 304 causes the display 110 not to display the determination result. On the other hand, if the second determination unit 303 determines that the signal abnormality occurs, the output unit 304 causes the display 110 to display the determination result.

In addition, the output unit 304 transmits the determination result of the second determination unit 303 to a terminal apparatus of a support staff via the communication unit 203 in accordance with the determination result of the second determination unit 303. The support staff is a staff who goes to an installation location of the image forming apparatus 100 to execute maintenance or the like. For example, if the second determination unit 303 determines that the signal abnormality does not occur, the output unit 304 does not transmit the determination result. On the other hand, if the second determination unit 303 determines that the signal abnormality occurs, the output unit 304 transmits the determination result.

If the first determination unit 301 determines that the rotation abnormality does not occur, the second determination unit 303 determines whether or not the signal abnormality occurs. However, even if the first determination unit 301 determines that the rotation abnormality occurs, the second determination unit 303 may determine whether or not the signal abnormality occurs. If the first determination unit 301 determines that the rotation abnormality occurs but the second determination unit 303 determines that the signal abnormality does not occur, the image forming apparatus 100 can estimate that an abnormality may occur in the rotation detection unit 311.

If the second determination unit 303 determines that the signal abnormality occurs, the driving control unit 305 sets the operation of the fixing motor 310 to be stoppable. The stop of the operation of the fixing motor 310 is the stop of the operation of the image forming apparatus 100. In this case, even if the second determination unit 303 determines that the signal abnormality occurs, the image forming apparatus 100 cannot be stopped instantaneously. Therefore, even if the second determination unit 303 determines that the signal abnormality occurs, the driving control unit 305 may be configured not to stop the operation of the fixing motor 310 (the operation of the image forming apparatus 100).

In addition, a threshold (second predetermined range) for stopping the operation of the fixing motor 310 may be set. The second predetermined range is a range that is wider than the first predetermined range. That is, even if the second determination unit 303 determines that the signal abnormality occurs, the driving control unit 305 may be configured not to stop the operation of the fixing motor 310 if the current value is in the second predetermined range and configured to stop the operation of the fixing motor 310 if the current value is not in the second predetermined range.

In the embodiment, if the second determination unit 303 determines that the signal abnormality occurs, the driving control unit 305 may be configured to stop the operation of the fixing motor 310 depending on selection of the user. If the first determination unit 301 determines that the rotation abnormality occurs, the image forming apparatus 100 cannot be used. Therefore, the driving control unit 305 is configured to stop the operation of the fixing motor 310 (the operation of the image forming apparatus 100) instantaneously.

The notification unit 306 gives notifications that are different between if the first determination unit 301 determines that the rotation abnormality occurs and if the second determination unit 303 determines that the signal abnormality occurs. If the first determination unit 301 determines that the rotation abnormality occurs, the notification unit 306 notifies that the rotation abnormality occurs. If the second determination unit 303 determines that the signal abnormality occurs, the notification unit 306 notifies that the signal abnormality occurs. The aspect of the notification may be a voice by the speaker 204 instead of or together with a display by the display 110.

In addition, in the embodiment, if a power supply is powered, the determination of the first determination unit 301 on the rotation abnormality and the determination of the second determination unit 303 on the signal abnormality are executed. The time if the power supply is powered is in a warm-up state immediately after the power supply is powered. As a result, the same condition can be adopted for each determination of the abnormality. Therefore, the accuracy of the determinations can be improved. These determinations are not necessarily executed if the power supply is powered, and may be executed during warm-up after wake-up from a sleep mode. The warm-up is executed for about 10 to 20 seconds.

Next, an abnormality determination process relating to the fixing unit 40 that is executed by the image forming apparatus 100 will be described using FIG. 5.

Figure 5:
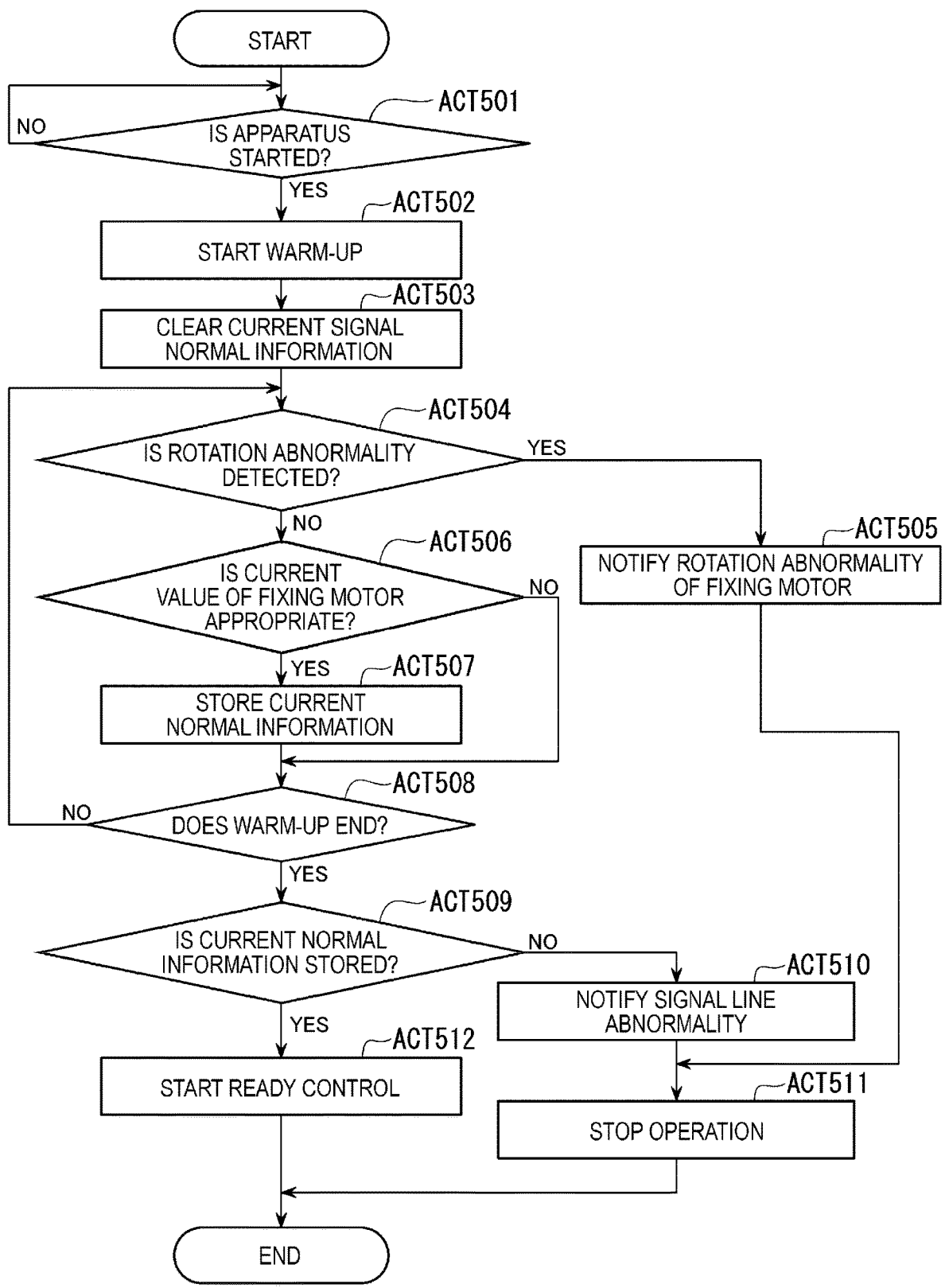
FIG. 5 is a diagram illustrating an example of an abnormality determination process relating to a fixing unit 40 that is executed by the image forming apparatus 100.

FIG. 5 is a diagram illustrating an example of the abnormality determination process relating to the fixing unit 40 that is executed by the image forming apparatus 100. As illustrated in FIG. 5, the image forming apparatus 100

(control unit 300) waits (ACT 501: NO) until, for example, a power supply switch is pressed to start the image forming apparatus 100. If the image forming apparatus 100 starts (ACT 501: YES), the image forming apparatus 100 starts warm-up (ACT 502).

Next, the image forming apparatus 100 clears current signal normal information stored in the memory 202 in the determination of the current value of the fixing motor 310 during previous warm-up from the memory 202 (ACT 503). The image forming apparatus 100 determines whether or not the rotation abnormality of the fixing motor 310 is detected (ACT 504). If the rotation abnormality of the fixing motor 310 is detected (ACT 504: YES), the image forming apparatus 100 notifies the rotation abnormality of the fixing motor 310 (ACT 505), and proceeds to ACT 511.

If the rotation abnormality of the fixing motor 310 is not detected (ACT 504: NO), the image forming apparatus 100 determines whether or not the current value of the fixing motor 310 is appropriate (in the predetermined range) (ACT 506). If the current value of the fixing motor 310 is not appropriate (ACT 506: NO), the image forming apparatus 100 proceeds to ACT 508. If the current value of the fixing motor 310 is appropriate (ACT 506: YES), the image forming apparatus 100 stores the current signal normal information in the memory 202 (ACT 507). Next, the image forming apparatus 100 determines whether or not the warm-up ends (ACT 508).

If the warm-up does not end (ACT 508: NO), the image forming apparatus 100 returns to ACT 504 and repeats the processes of ACT 504 to ACT 507. Therefore, if the current value of the fixing motor 310 is an appropriate value even once, the current signal normal information is stored in the memory 202. In other words, unless the current value of the fixing motor 310 is an appropriate value at all times, the current signal normal information is not stored in the memory 202. However, the embodiment is not limited to this configuration, and if the current value of the fixing motor 310 is an appropriate value a predetermined number of times or more, the current signal normal information may be stored in the memory 202.

If the warm-up ends (ACT 508: YES), the image forming apparatus 100 determines whether or not the current signal normal information is stored in the memory 202 (ACT 509). If the current signal normal information is not stored in the memory 202 (ACT 509: NO), the image forming apparatus 100 notifies the abnormality of the signal line 320 (ACT 510). The image forming apparatus 100 stops the operation (ACT 511) and ends the series of processes. During the notification in ACT 505 or ACT 510, the image forming apparatus 100 transmits the content to a terminal apparatus of a support staff. As a result, the notification can urge the support staff to execute maintenance for the abnormality.

If the current signal normal information is stored in the memory 202 in ACT 509 (ACT 509: YES), the image forming apparatus 100 starts a ready control (ACT 512) to prepare printing, and ends the series of processes.

Next, a notification example of the abnormality relating to the fixing unit 40 that is displayed by the display 110 will be described using FIGS. 6 and 7.

Figure 6:
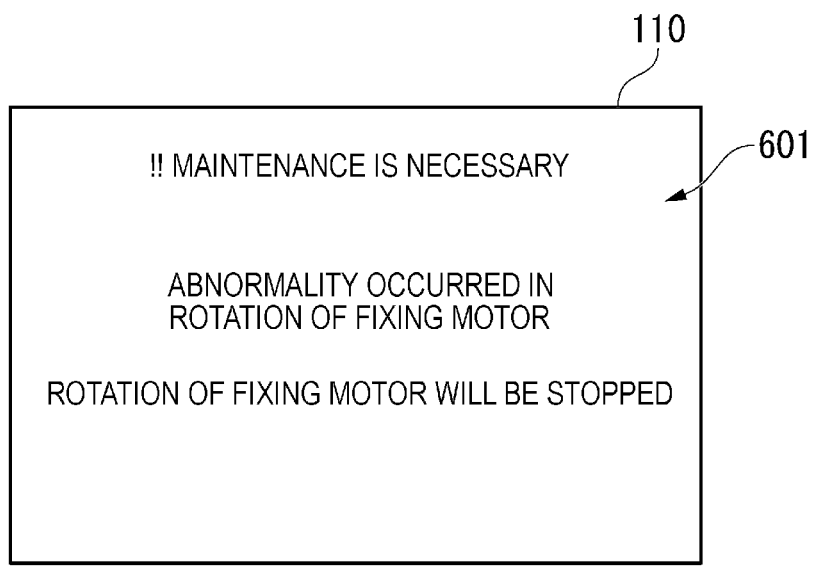
FIG. 6 is a diagram illustrating a notification example of a rotation abnormality relating to the fixing unit 40 that is displayed by a display 110.

FIG. 6 is a diagram illustrating a notification example of the rotation abnormality relating to the fixing unit 40 that is displayed by the display 110. In FIG. 6, a rotation abnormality notification screen 601 is a screen that is displayed if the rotation abnormality of the fixing motor 310 is detected. The rotation abnormality notification screen 601 includes a content that the fixing motor 310 is abnormal and a content that the operation of the image forming apparatus 100 is stopped.

Figure 7:
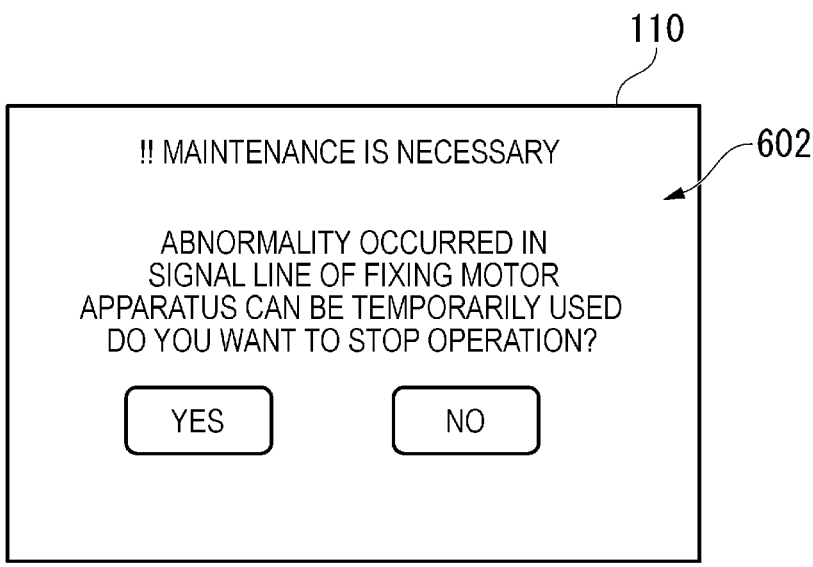
FIG. 7 is a diagram illustrating a notification example of a signal abnormality relating to the fixing unit 40 that is displayed by the display 110.

FIG. 7 is a diagram illustrating a notification example of the signal abnormality relating to the fixing unit 40 that is displayed by the display 110. In FIG. 7, a signal line abnormality notification screen 602 includes a content that the abnormality is detected in the signal line 320 of the fixing motor 310 and a confirmation button for confirming whether or not to stop the operation of the image forming apparatus 100. The confirmation button includes a "YES" button for receiving the stop of the operation and a "NO" button for receiving the continuation of the operation. If the user presses the "YES" button, the operation of the image forming apparatus 100 stops. On the other hand, if the user presses the "NO" button, the operation of the image forming apparatus 100 continues. In this case, even if the operation of the image forming apparatus 100 continues, the image forming apparatus 100 may notify that maintenance is necessary at predetermined intervals.

As described above, in the image forming apparatus 100 according to the embodiment, after determining whether or not the rotation abnormality of the fixing motor 310 occurs, it is determined whether or not the signal abnormality relating to the signal line 320 occurs based on the current value of the current signal of the fixing motor 310, and the determination result is output. As a result, while reducing erroneous determination caused by an inrush current, the abnormality (short-circuit or disconnection) of the signal line 320 of the current signal of the fixing motor 310 can be simply determined with high accuracy. Accordingly, estimation failure of an abnormality or a breakdown around the fixing motor 310 can be reduced with high efficiency.

In addition, in the image forming apparatus 100 according to the embodiment, if the determination is made that the rotation abnormality of the fixing motor 310 does not occur, it is determined whether or not the signal abnormality occurs. As a result, whether or not the abnormality of the signal line 320 occurs can be determined under the same condition that the rotation abnormality does not occur. Therefore, the determination can be made with higher accuracy.

In addition, in the image forming apparatus 100 according to the embodiment, the operation of the fixing motor 310 is set to be stoppable if the determination is made that the signal abnormality occurs. As a result, if the determination is made that the abnormality of the signal line 320 occurs, the use of the image forming apparatus 100 can be stopped. Accordingly, estimation failure of an abnormality or a breakdown around the fixing motor 310 can be reduced.

In addition, in the image forming apparatus 100 according to the embodiment, notifications that are different between if the determination is made that the rotation abnormality of the fixing motor 310 occurs and if the determination is made that the abnormality of the signal line 320 occurs are given. As a result, the user can grasp the content of the occurred abnormality. In addition, at a manufacturing stage, a manufacturing staff can grasp the content of the abnormality and can correct the abnormal portion quickly.

In addition, in the image forming apparatus 100 according to the embodiment, the determination on whether or not the rotation abnormality of the fixing motor 310 occurs and the determination on whether or not the signal abnormality relating to the signal line 320 occurs are executed if the power supply is powered. As a result, the same condition can be adopted for each determination of the abnormality. Therefore, whether or not the abnormality of the fixing motor 310 occurs and whether or not the signal abnormality occurs can be determined with higher accuracy.

In addition, the driving unit to be controlled by the image forming apparatus 100 according to the embodiment is the fixing motor 310 used in the fixing unit 40. As a result, estimation failure of an abnormality or a breakdown around the fixing unit 40 can be reduced with high efficiency.

In the embodiment, the fixing unit 40 as a target to be controlled by the control unit 300 is described as an example. However, the target to be controlled by the control unit 300 is not limited to the fixing unit 40. For example, any member or portion can be adopted as a target to be controlled by the control unit 300 as long as it is a portion where the current value of the current signal of the driving unit can be acquired after determining whether or not the rotation abnormality of a member that rotates with the rotation of the driving unit and the drive motor occurs. More specifically, for example, if the sheet conveying unit 50 is a target to be controlled, the control unit 300 may acquire the current value of the current signal of the drive motor to determine whether or not the signal abnormality occurs after determining whether or not the rotation abnormality of the driving roller that is rotated by the drive motor and the drive motor occurs. As a result, estimation failure of an abnormality or a breakdown around the drive motor can be reduced with high efficiency.

Each of the functions of the image forming apparatus 100 in the embodiment may be implemented by a computer. In this case, the function may be realized by recording a program for implementing this function in a computer-readable recording medium and causing a computer system to read the program recorded in the recording medium and to execute the read program. The definition of "computer system" described herein includes an OS and a hardware such as a peripheral. In addition, "computer-readable recording medium" refers to a storage device, for example, a portable medium such as a flexible disk, a magneto-optic disk, a ROM, or a CD-ROM or a hard disk built into a computer system. Further, "computer-readable recording medium" may also refer to a medium that dynamically stores a program for a short period of time like a communication line if a program is transmitted through a network such as the Internet or a communication line such as a telephone line or refer to a medium that stores a program for a certain period of time like a volatile memory in a computer system functioning as a server or a client. In addition, the program may implement some of the above-described functions or may implement the above-described function in combination with a program recorded in a computer system in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such embodiments or modifications as would fall within the scope and spirit of the inventions.

What is claimed is:

1. An image forming apparatus, comprising:
   a driving device; and
   a processor that functions as:
   a first determination component configured to determine whether or not a rotation abnormality relating to rotation of the driving device occurs;
   a second determination component configured to determine whether or not a signal abnormality relating to a signal line of a current signal of the driving device occurs based on a current value of the current signal after the first determination component determines whether or not the rotation abnormality occurs; and
   an output component configured to output a determination result of the second determination component, wherein the determination result represents a time value until a breakdown event, and wherein the breakdown event is determined based on the signal abnormality, the rotation abnormality, a jam occurrence state, and a number value of sheets that have been output by the image forming apparatus.

2. The image forming apparatus according to claim 1, wherein if the first determination component determines that the rotation abnormality does not occur, the second determination component determines whether or not the signal abnormality occurs.

3. The image forming apparatus according to claim 1, wherein the processor functions as: a driving controller configured to set an operation of the driving device to be stoppable if the second determination component determines that the signal abnormality occurs.

4. The image forming apparatus according to claim 1, wherein the processor functions as: a notification component configured to give notifications that are different among if the first determination component determines that the rotation abnormality occurs and if the second determination component determines that the signal abnormality occurs.

5. The image forming apparatus according to claim 1, wherein the determination of the first determination component on the rotation abnormality and the determination of the second determination component on the signal abnormality are executed if a power supply is powered.

6. The image forming apparatus according to claim 1, wherein the driving device is used in a fixing device that fixes an image to a sheet.

7. A method for an image forming apparatus including a driving device, the method comprising:
   determining whether or not a rotation abnormality relating to rotation of the driving device occurs;
   determining whether or not a signal abnormality relating to a signal line of a current signal of the driving device occurs based on a current value of the current signal after determining whether or not the rotation abnormality occurs; and
   outputting a determination result of determining whether or not the signal abnormality occurs, wherein the determination result represents a time value until a breakdown event, and wherein the breakdown event is determined based on the signal abnormality, the rotation abnormality, a jam occurrence state, and a number value of sheets that have been output by the image forming apparatus.

8. The method according to claim 7, further comprising wherein if the rotation abnormality does not occur, determining whether or not the signal abnormality occurs.

9. The method according to claim 7, further comprising setting an operation of the driving device to be stoppable if the signal abnormality occurs.

10. The method according to claim 7, further comprising generating notifications that are different among if the rotation abnormality occurs and if the signal abnormality occurs.

11. The method according to claim 7, further comprising if a power supply is powered, executing a determination for the rotation abnormality and the signal abnormality.

12. The method according to claim 7, further comprising using the driving device in fixing an image to a sheet.

13. A method for an image forming apparatus, comprising:
driving one of a heating roller and a pressurization roller;
determining whether or not a rotation abnormality relating to rotation of the driving occurs;
determining whether or not a signal abnormality relating to a signal line of a current signal of the driving occurs based on a current value of the current signal after determining whether or not the rotation abnormality occurs; and
outputting a determination result of determining whether or not the signal abnormality relating to the signal line of the current signal of the driving occurs, wherein the determination result represents a time value until a breakdown event, and wherein the breakdown event is determined based on the signal abnormality, the rotation abnormality, a jam occurrence state, and a number value of sheets that have been output by the image forming apparatus.

14. The method according to claim 13, further comprising if determining that the rotation abnormality does not occur, determining whether or not the signal abnormality occurs.

15. The method according to claim 13, further comprising setting an operation of the driving to be stoppable if determining that the signal abnormality occurs.

16. The method according to claim 13, further comprising generating notifications that are different among if determining that the rotation abnormality occurs and if determining that the signal abnormality occurs.

17. The method according to claim 13, further comprising if a power supply is powered; executing the determining on the rotation abnormality and the determining on the signal abnormality.

18. The method according to claim 13, further comprising using driving in a fixing an image to a sheet.

19. The method according to claim 13, further comprising driving only the heating roller.

20. The method according to claim 13, further comprising driving only the pressurization roller.

* * * * *